United States Patent [19]

Herczl et al.

[11] Patent Number: 5,559,882
[45] Date of Patent: Sep. 24, 1996

[54] SANITARY DEVICE FOR USE WITH TELEPHONES

[75] Inventors: David Herczl; Mike Kohn, both of Brooklyn, N.Y.

[73] Assignee: Healthy Calls, Inc., New York, N.Y.

[21] Appl. No.: 298,436

[22] Filed: Aug. 30, 1994

[51] Int. Cl.⁶ .................................................. H04M 1/00
[52] U.S. Cl. ........................................... 379/452; 379/439
[58] Field of Search ................................... 379/451, 452, 379/437, 439, 447

[56] References Cited

U.S. PATENT DOCUMENTS

| | | | |
|---|---|---|---|
| 1,140,048 | 5/1915 | Loeber | 379/452 |
| 2,593,382 | 4/1952 | Zimmermann | 379/452 |
| 4,736,418 | 4/1988 | Steadman | 379/451 |

FOREIGN PATENT DOCUMENTS

| | | | |
|---|---|---|---|
| 221794 | 2/1925 | United Kingdom | 379/452 |

Primary Examiner—Jeffery Hofsass
Assistant Examiner—Jack Chiang
Attorney, Agent, or Firm—Steinberg, Raskin & Davidson, P.C.

[57] ABSTRACT

A sanitary device for protecting an individual from being infected by germs present on telephones. One embodiment includes one or two elements having a planar contact member which fits over the earpiece or mouthpiece of a telephone receiver to protect the user from the transmission of germs. The elements include a ring surrounding the planar contact member and connected thereto by resilient connecting arms. In another embodiment, the device includes a flexible member having two open interior regions, two substantially planar regions adjoining respective ones of the interior regions, and a connecting portion. The planar regions are structured and arranged to fit directly against the sound-receiving portion of the mouthpiece or the sound-emitting portion of the earpiece of the telephone handset while the connecting portion is positioned at a rear of the handset such that the mouthpiece and earpiece extend through a respective one of the interior regions.

20 Claims, 5 Drawing Sheets

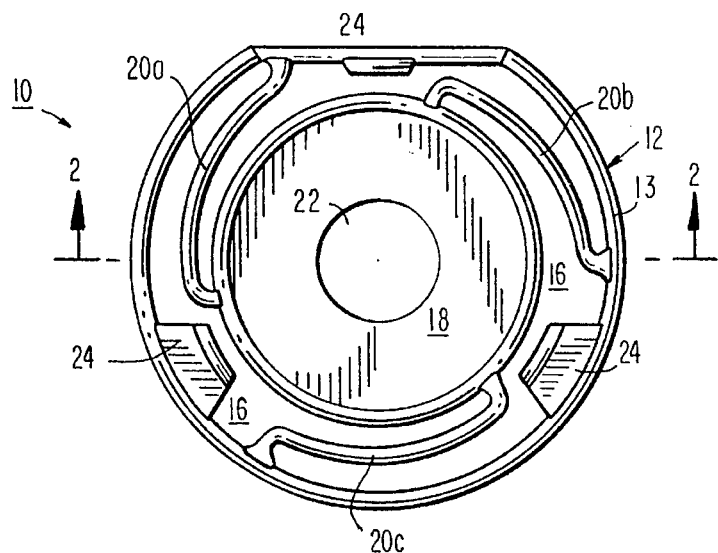
FIG. 2
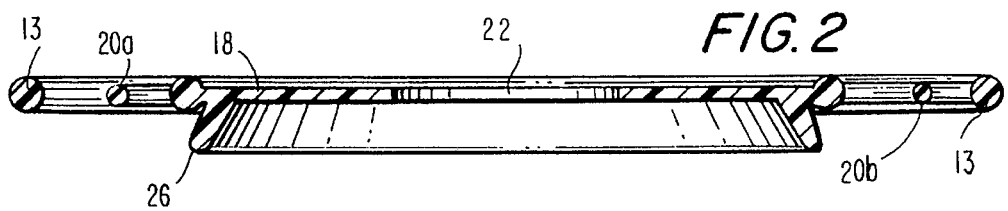
FIG. 3
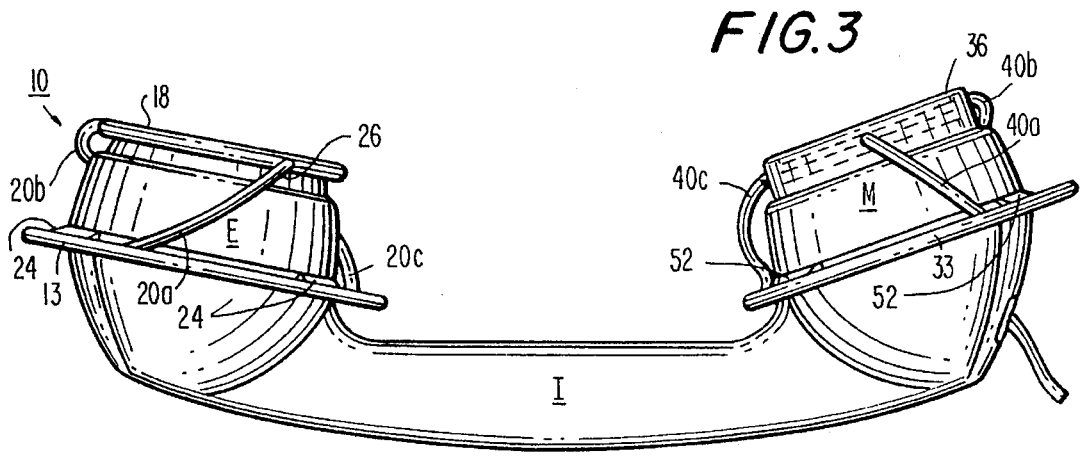

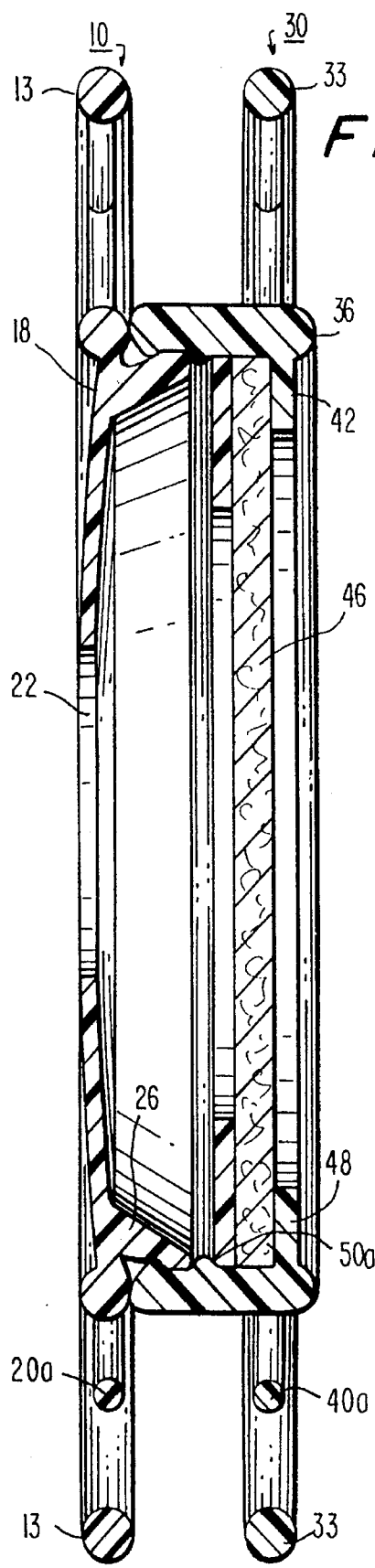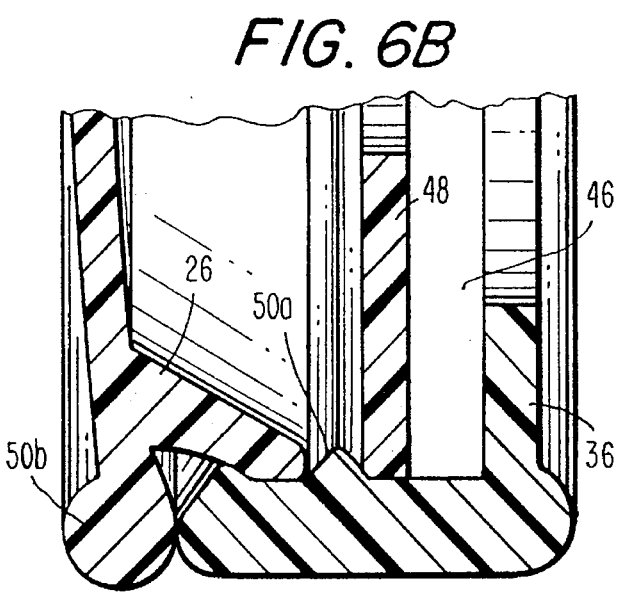

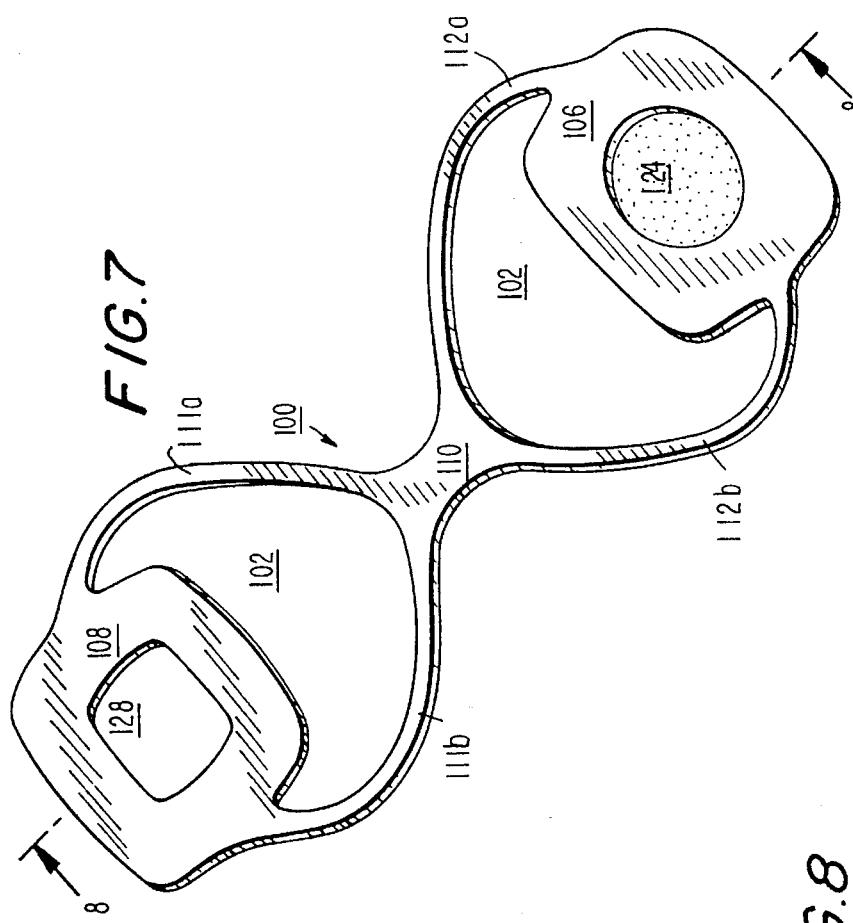
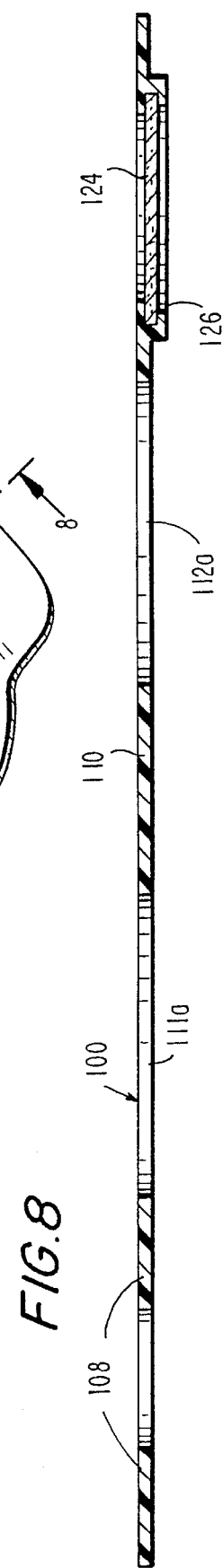
FIG. 7
FIG. 8

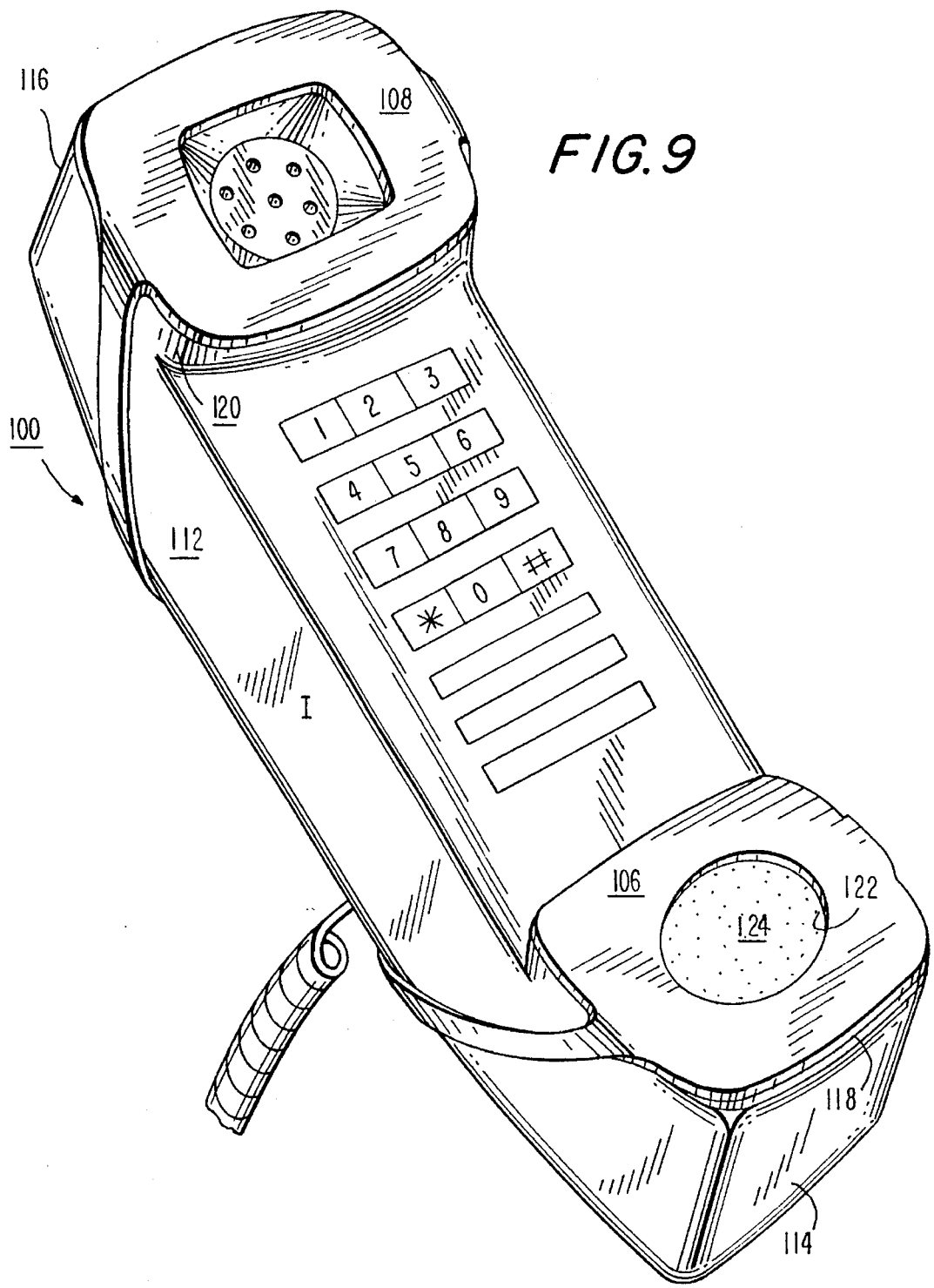

SANITARY DEVICE FOR USE WITH TELEPHONES

BACKGROUND OF THE INVENTION

The invention relates to a device for protecting an individual using a telephone from becoming infected by germs or pathogenic bacteria present on the telephone. The device serves to inhibit the transmission of germs contained on the mouthpiece and earpiece of the telephone handset to the user of the device.

It is a problem when using telephones that communicable and/or contagious diseases of a previous user may be spread to the next user of the telephone through contact with the elements of the telephone, namely the earpiece and mouthpiece. The next user is thus unfortunately infected with the disease.

Public telephones, in particular, are handled by a multitude of people each and every day. In the likely event that at least one of this multitude of people is sick with a communicable disease, every subsequent user is subject to infection by whatever germs or pathogenic microorganisms might be able to sustain themselves on the telephone components until being passed on.

Moreover, other than germs, telephones which are handled by large numbers of people may from time to time accumulate other undesirable substances thereon, e.g., greases, saliva or other bodily fluids, containing potentially infectious diseases.

From a public health standpoint, it is clearly desirable to contain the spread of contagious and communicable diseases.

A number of attempts have been made in the past to provide a solution to this problem and prevent germs or other undesirable elements from being transmitted through contact with public telephones. In general, prior art devices include a structure which fits over the mouthpiece and earpiece of the telephone handset and interposes an interface layer between the mouth and ear of the user and the corresponding mouthpiece and earpiece of the telephone.

One such prior art device is described in U.S. Pat. No. 3,962,555 wherein a one piece disposable telephone handset guard includes first and second cap means for covering the receiver and transmitter of the handset and a substantial portion of the handset excluding the dial mechanism. Filter means are arranged in each of the first and second cap means, i.e., to filter out germs, and connecting means integrally connect the first and second cap means. It is a significant drawback of this device that it is specifically designed to fit a particular size telephone so that for each size, a different telephone guard is required. This device is also not easy to carry and store in a compact shape.

U.S. Pat. No. 4,582,966 describes a prior art device for protecting a speaker (mouthpiece) and earpiece on a telephone handset from collecting germs and the like. This device consists of a flat frame member secured between a pair of receptacles and shaped to cover the speaker and the earpiece when the frame member is clamped against the telephone handset. Each receptacle has a replaceable filter which does not interfere with the operation of the telephone. This device has a rigid structure connecting the pair of receptacles and which is fastened to the inner side of the telephone handset handle portion. It is a drawback of this device that it is not very compact as a result of the rigid structure. It is another drawback of this device that the filter is not easily removable and is not supported in the device during use.

French Patent No. 1,024,191 describes a device having a pair of receptacles connected by an elastic cord and arranged to cover the earpiece and mouthpiece of a telephone. Each of the receptacles has a number of openings for transmitting sound between the user and the telephone.

French Patent No. 2,598,874 describes a protective cover for a telephone handset having a pair of bowl-shaped circular, perforated covers which protect the user from contamination by germs and the like which maybe contained on the telephone components. The covers include a resilient elastic edge and may be fitted over the mouthpiece and earpiece of the telephone handset. A flexible cord is arranged to connect the covers. However, in this device there is no intermediate layer between the telephone and the surfaces which contact the user to prevent germs from passing through the sound apertures and infecting the user with germs present on the telephone.

In the prior art, reference is also made to U.S. Pat. Nos. 1,398,029, 2,593,382, 2,700,075, 3,169,171 and 5,054,063 and German Patent Nos. 58,299 and 237,844 which describe other protective covers for telephone handsets.

OBJECTS AND SUMMARY OF THE INVENTION

Accordingly, it is an object of the present invention to provide a new and improved sanitary device including parts arranged to be placed over the mouthpiece and/or earpiece of a telephone in which drawbacks related to the prior art devices are substantially eliminated.

It is another object of the present invention to provide a device having separate elements to be placed over the mouthpiece and earpiece of a telephone which can be easily stored in a compact fashion and reused.

It is yet another object of the present invention to provide a device for placing over at least one of the mouthpiece and earpiece of a telephone in which a removable filter element can be placed. Once the filter element is rendered unclean, it can be easily replaced for a new, clean filter element.

It is still another object of the present invention to provide a sanitary attachment for a telephone which is of simple construction and may be discarded and replaced cheaply when its effectiveness is ended.

Briefly, in accordance with the present invention, these and other objects are attained by a sanitary device for covering a mouthpiece and/or earpiece of a telephone handset to protect the user from the transmission of germs. The device is of simple construction and inexpensive and may be designed to fit over any telephone.

One embodiment of the device in accordance with the invention includes a ring-shaped element having an open interior which is positionable around the mouthpiece or earpiece of the telephone handset, a substantially planar member arranged in the element interior and which is positionable directly over the sound-receiving portion of the mouthpiece or the sound-emitting portion of the earpiece of the telephone handset, and connecting means for resiliently connecting the element to the member such that the member is displaceable away from the element during use of the device and returns toward the element during non-use of the device. By means of this construction, the element may be securely retained on the periphery of the handset during use while the member covers the mouthpiece or earpiece. During non-use, the element and member are situated in substantially the same plane for compact storage and later re-use. Thus, the connecting means permit displacement of the member in a direction perpendicular to the stationary plane in which the element and member are normally situated.

Preferably, the member includes retaining means for retaining a gauze or mesh fabric for restricting the transmission of germs from the mouthpiece or earpiece to a user of the device. The gauze or mesh fabric is arranged in the device, and securely held therein, prior to use to restrict the transmission of germs from the mouthpiece and earpiece of the handset to the mouth and ear, respectively, of the user. To this end, the member has opposed sides, a lateral periphery bordering the sides, and an aperture therein over which the mesh fabric or gauze is positioned. In a preferred embodiment, the connecting means which connect the element and the member comprise one or more flexible material strips interconnected between the element and the member, e.g., the lateral periphery thereof. If a plurality of strips are used, the strips are ideally placed symmetrically around the lateral periphery of the member in a position to maintain the member in a plane parallel to the plane in which the element is situated, i.e., to provide a stable displacement to cover the mouthpiece or earpiece of the device, and such that there is a substantially equal distance between each pair of adjacent strips.

To securely retain the device on the mouthpiece or earpiece during use thereof, the element is provided with engagement means, e.g., inwardly directed projections, for engaging peripheral surfaces of the mouthpiece or earpiece.

The device may be used alone to cover only one of the mouthpiece or earpiece of a telephone handset or two such devices may be used in combination, one to cover the mouthpiece and the other to cover the earpiece. In this case, the elements are provided with suitable attachment means to attach the elements to each other during non-use of the device. Further, in the device which covers the earpiece, the member may be provided only with apertures for permitting the transmission of sound therethrough whereby in the device that covers the mouthpiece, a gauze or mesh fabric may be installed. To use the device, the elements are separated from one another and placed over either the mouthpiece or the earpiece. The elements may be constructed in any shape or form and can be designed to fit over any variety of telephone transmitting elements, e.g., circular, square.

In another embodiment of the invention, the device comprises a flexible, pliant member, e.g., made of thermoplastic rubber, having two open interior regions, two substantially planar sections adjoining a respective interior region, and a connecting portion. The planar regions are arranged to fit directly against the sound-receiving portion of the mouthpiece or the sound-emitting portion of the earpiece of the telephone handset whereby the mouthpiece or earpiece extends through the interior regions and the connecting portion is positioned at a rear of the handset. Preferably, at least one of the planar regions comprises an aperture therein and means for retaining a mesh fabric or gauze for covering the aperture. The other planar region should include apertures for permitting the transmission of sound therethrough.

In the following, the invention will be described in detail with reference to some exemplifying embodiments of the invention illustrated in the figures in the accompanying drawing. However, the invention is by no means strictly confined to the details of these embodiments.

BRIEF DESCRIPTION OF THE DRAWINGS

The following drawings are illustrative of embodiments of the invention and are not meant to limit the scope of the invention as encompassed by the claims.

FIG. 1 illustrates a first embodiment of the sanitary device in accordance with the present invention.

FIG. 2 is a sectional view taken along the line 2—2 of FIG. 1 of the first embodiment of the sanitary device in accordance with the present invention.

FIG. 3 is a side view of the first embodiment of the invention shown in FIG. 1 and a second embodiment of the invention during use covering the earpiece and mouthpiece of a telephone handset, respectively.

FIG. 6A is a cross-sectional view of the assembly formed from the coupling of the first and second embodiments of the invention.

FIG. 6B is an enlarged view of the coupling shown in FIG. 6B.

FIG. 7 is a perspective view of a third embodiment of the invention.

FIG. 8 is a cross-sectional view of the embodiment of FIG. 7 taken along the line 8—8.

FIG. 9 is a view of the embodiment shown in FIG. 7 in use, i.e., placed over a telephone handset.

DETAILED DESCRIPTION OF THE INVENTION

Figure 4:
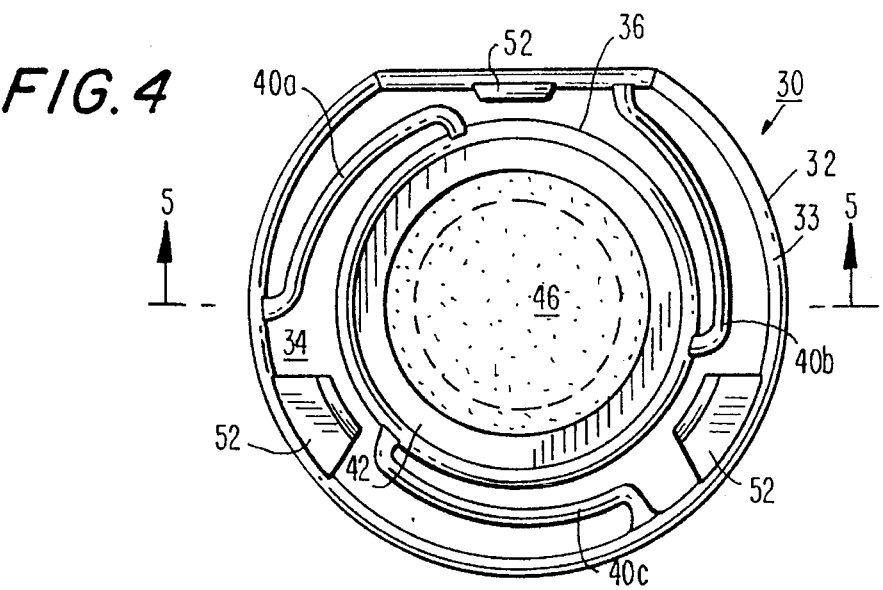
FIG. 4 illustrates the second embodiment of the sanitary device in accordance with the present invention.

Referring to FIGS. 1–3, a first embodiment of the sanitary device for use with telephones in accordance with the invention is denoted generally with reference numeral 10. The device 10 can be placed over a telephone T to cover the earpiece E as shown in FIG. 3 or over the mouthpiece thereon. The device 10 may be equipped to interpose protective material between the surfaces of the earpiece or mouthpiece to thereby protect the user from the transmission of germs. The device 10 comprises a member or element 12 which is adapted to fit over and around the earpiece or mouthpiece of the conventional telephone as shown in FIG. 3. The member 12 has a substantially circular shape and substantially circular regions therein adapted to fit over circular telephone mouthpieces and earpieces. However, the member 12 may be constructed to be compatible with any variety of telephones, i.e, those having square or rectangular mouthpiece and earpieces, and may be provided in any shape or size to fit the specific telephone.

Referring to FIGS. 1–3 which illustrate member 12 which is particularly designed to fit over the earpiece of the telephone, member 12 comprises a frame or substantially ring-shaped element 13 having an open interior region 16 in which a substantially planar section or contact member 18 is arranged. Contact member 18 preferably conforms to the particular sound-emitting portion of the earpiece of the telephone in connection with which the device is used, i.e. circular as shown. Member 12 also includes extension and connecting arms 20a,20b,20c, at least one of which is required, to resiliently connect an inwardly facing surface of element 13 to an outwardly facing surface of planar contact member 18. Each arm 20a,20b,20c comprises a flexible material strip having one end connected to the inner face of the element 13 and a second end connected to the lateral periphery of planar contact member 18. Upon the exertion of pressure on the planar contact member 18, while maintaining the ring element 13 in a fixed position, the contact member 18 is displaced away from the element 13 and upon release of the pressure force, the contact member 18 resiliently springs back to its original position in a direction toward the element 13. This displacement is facilitated by the resiliency of the arms 20a,20b,20c, which also cause the contact member 18 to twist and turn slightly as the contact member is distanced from the ring element 13.

Other resilient connection means may be applied to connect the ring element 13 to the planar contact member 18, e.g., springs, which enable the contact member 18 to be displaced from the plane in which both the ring element 13 and contact member 18 are situated during a rest position, i.e., non-use of the device, to an extended position wherein the ring element 13 fits over and around the earpiece of the telephone handset while the contact member 18 abuts directly against the sound emitting portion of the earpiece, i.e., during use of the device. The resiliency of the connection means enables the contact member 18 to be returned to its rest position for compact storage and later re-use.

Planar contact member 18 comprises at least one aperture 22 for permitting the transmission of sound from one side of the planar contact member 18 to an opposed side thereof. Contact member 18 further includes a projecting ring 26 which directly contacts the surface of the sound-emitting portion of the earpiece or the sound-receiving portion of the mouthpiece to space the planar contact member therefrom. An additional function of the projecting ring 26 is to engage with another similar device used to cover the mouthpiece which will be described in detail below.

The ring element 13 further comprises engagement means such as the inwardly facing projections 24 which serve to engage with surfaces of the mouthpiece or earpiece other than the surface which contacts the planar contact member 18. By means of the engagement of projections 24 to the earpiece as shown in FIG. 3, the element 13 is securely positioned in connection with the earpiece or mouthpiece while at the same time, the planar contact member covers the sound emitting portion of the earpiece or the sound-receiving portion of the mouthpiece. In this manner, the displaced positioning of the element 13 relative to the planar contact member 18 can be stably maintained during use of the device.

Figure 5:
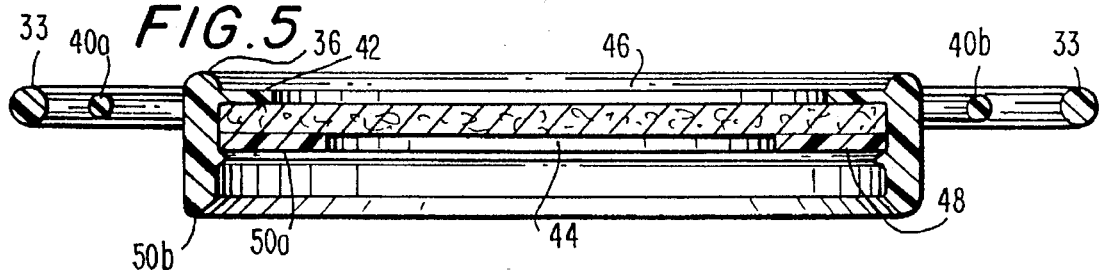
FIG. 5 is a sectional view taken along the line 5—5 of FIG. 4 of the second embodiment of the sanitary device in accordance with the present invention.
Figure 6:
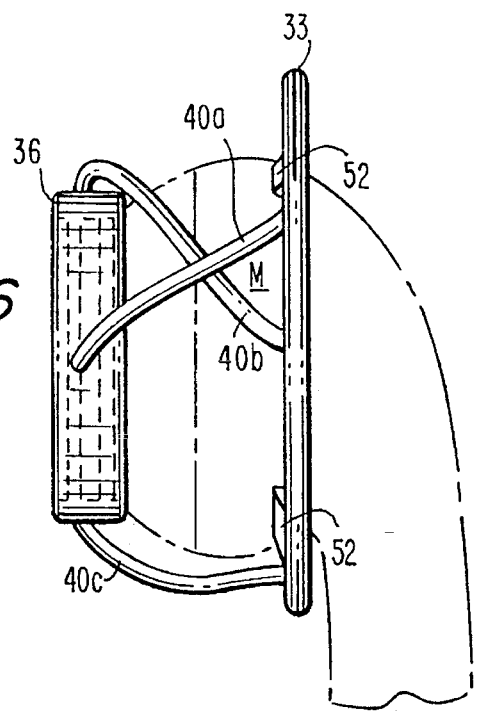
FIG. 6 is a side view of the second embodiment of the invention in use covering the mouthpiece or earpiece of a telephone handset.

Referring to FIGS. 4–6, a second embodiment of the sanitary device for use with telephones in accordance with the invention is denoted generally with reference numeral 30. This embodiment of the device is particularly designed to be placed over a mouthpiece M of the device as shown in FIG. 3. The device 30 functions to interposes protective material between the surfaces of the mouthpiece to thereby protect the user from the transmission of germs. The device 30 includes a member or element 32 having a substantially circular shape and circular regions therein adapted to fit over telephones having circular mouthpieces. However, the member 32 may be constructed to be compatible with any variety of telephones, i.e, those having square or rectangular mouthpiece and earpieces, and may be provided in any shape or size to fit the specific telephone.

Member 32 comprises a substantially ring-shaped element 33 having an open interior space 34 in which a frame element 36 is arranged. Frame 36 preferably conforms to the shape of the sound-receiving portion of the mouthpiece of the telephone in connection with which the device is used, i.e. circular as shown. Member 32 also includes extension and connecting arms 40a,40b,40c, at least one of which is required, to resiliently connect an inwardly facing surface of element 33 to an outwardly facing surface of frame 36. The arms 40a,40b,40c comprise a flexible material strip having one end connected to the inner face of the element 33 and a second end connected to the lateral periphery of frame 36. Upon the exertion of pressure on frame 36, while maintaining the ring element 33 in a fixed position, the frame 36 is displaced away from the element 33 to the position and upon release of the pressure force, the frame 36 resiliently springs back to its original position in a direction toward the element 33. This displacement is facilitated by the resiliency of the arms 40a,40b,40c, which also cause the frame 36 to twist and turn slightly as the frame 36 is distanced from the ring element 33.

As in the embodiment shown in FIGS. 1 and 2, other resilient connection means may be applied to connect the ring element 33 to the frame 36, e.g., springs, which enable the frame 36 to be displaced from the plane in which both the ring element 33 and frame 36 are situated during a rest position, i.e., non-use of the device, to an extended position wherein the ring element 33 fits over and around the mouthpiece of the telephone handset while the frame 36 abuts directly against the sound receiving portion of the mouthpiece, i.e., during use of the device. The resiliency of the connection means enables the frame 36 to be returned to its rest position for compact storage and later re-use.

Frame 36 defines an aperture 44 therein and comprises a thin lip 42 extending inwardly from the inner peripheral surface of frame 36 partially into the aperture 44. A gauze or mesh fabric 46 is placed against the inner surface of the lip 44 and a securing member 48 is placed behind the gauze or mesh fabric 46 to retain the gauze or mesh fabric 46 within the frame 36. The securing member has an aperture therein to enable the transmission of sound therethrough. The gauze or mesh fabric 46 usually does not prevent the transmission of sound but rather acts as a screen to prevent the transmission of germs and other pathogenic microorganisms from the mouthpiece to the user of the device. Frame 36 further includes projections 50a,50b extending around the inner peripheral surface thereof. A first projection 50a closest to the lip 42 serves to securely retain the securing member 48 in the frame 36. At the same time, the securing member 48 can be detached from the frame 36 when it is necessary or desired to replace the mesh 46. The above structure thus constitutes a ring filter.

Element 33 further comprises engagement means such as the inwardly facing projections 52 which serve to engage with surfaces of the mouthpiece other than the surface which contacts the frame 36. By means of the engagement of projections 52 to the mouthpiece as shown in FIG. 3, the element 33 is securely positioned in connection with the mouthpiece while at the same time, the frame 36 covers the sound receiving portion of the mouthpiece. In this manner, the displaced positioning of the element 33 relative to the frame 36 can be stably maintained during use of the device.

FIG. 6 illustrates the displaced position of the frame 36 with respect to the ring 33 during use of the device 30. The projections 52 engage with surfaces of the mouthpiece to provide a stable connection between the ring element 33 and the mouthpiece M while simultaneously maintaining the frame 36 over the sound receiving portion of the mouthpiece.

FIGS. 6A and 6B illustrate the coupling arrangement of the first embodiment of the invention described above with reference to FIGS. 1–2 and the second embodiment of the device described with reference to FIGS. 4–6. Coupling of the two embodiment is especially desirable whereby the embodiment of FIGS. 1–2 is used to cover the earpiece and the embodiment of FIGS. 4–6 is used to cover the mouthpiece.

To this end, before and after use, the downwardly projecting ring 26 of the device 10 is aligned with the interior of the frame 36 and snapped into engagement therewith by means of the projection 50b. By applying opposed forces on device 10 and device 30, it is possible to separate the device by causing the release of the projecting ring 26 from engagement with the projection 50b.

FIGS. 7–9 illustrate a second embodiment of the invention which is placed over a telephone handset to prevent the transmission of germs to the user of the telephone. In this embodiment, an elongate flexible member 100 comprises a pair of open interior regions 102,104, two substantially planar sections or regions of material 106,108 adjoining a respective one of the interior regions, and a connecting portion 110. Extension arms 111a,111b, 112a,112b extend from the connecting portion 110 to the planar regions 106,108 (two arms as shown in the illustrated embodiment from the connecting portion to each planar region), to thereby define the open interior regions 102,104 between the arms, the connecting portion 110 and the respective planar region 106,108. The planar regions 106,108 are provided with a desired shape and size to accommodate and fit against the particular type and shape of the mouthpiece and earpiece of the telephone handset during use as shown in FIG. 9.

In use, the device is first positioned at a rear of the telephone handset, i.e., on the side opposite the side on which the mouthpiece and earpiece are situated, and ends 114,116 of the telephone handset 112 are inserted, by stretching the device 100 if needed, through a respective open interior region 102,104 of the device such that the planar regions 106,108 fit directly against the sound-receiving portion of the mouthpiece 118 and the sound-emitting portion of the earpiece 120, respectively, of the telephone handset 112. In this manner, the connecting portion 110 will be placed at a rear of the handset 112.

The planar regions 106,108 have opposed sides and a lateral periphery bordering the sides. In a preferred embodiment, at least one of the planar regions 106,108 has an aperture extending therethrough and retaining means 126 for retaining a mesh fabric or gauze 124 in a position to cover the aperture. The mesh fabric or gauze is dirtied during use and may be easily and readily replaced. Preferably, the planar region 108 covering the earpiece is provided with an aperture 128 for permitting the transmission of sound and the planar region 106 covering the mouthpiece is provided with the retaining means 126 including the mesh or gauze fabric covering an aperture 122. The retaining means may comprise a ring filter as shown in FIG. 8 in a like manner as described with reference to FIG. 5.

In a preferred embodiment, the device 100 is made of a flexible and stretchable material such as thermoplastic rubber so that the device can be stretched over the ends 114,116 of the telephone handset.

The examples provided above are not meant to be exclusive. Many other variations of the present invention would be obvious to those skilled in the art, and are contemplated to be within the scope of the appended claims.

We claim:

1. A sanitary device for covering a mouthpiece or earpiece of a telephone handset to protect the user from the transmission of germs contained thereon, comprising
   a frame element defining an open interior,
   a substantially planar member arranged in said element interior, and
   connecting means for resiliently connecting said element to said member, said connecting means having a first position in which said member and said element rest in a first, substantially common plane and a second position in which said member is completely displaced from said first plane and situated in a second plane whereby the mouthpiece or earpiece of the telephone handset is positionable between said first plane and said second plane.

2. The device of claim 1, wherein said member has an interior portion and includes retaining means for retaining a gauze or mesh fabric in said interior, said retaining means comprising a lip extending inwardly from an inner peripheral surface of said frame into said frame interior, a securing member positionable within said frame interior, and a projection spaced from said lip and extending inwardly into said frame interior, said securing member being held by said projection in said member interior and said mesh or gauze fabric being retained between said lip and said securing member.

3. The device of claim 1, wherein said member has opposed sides, a lateral periphery bordering said sides, and an aperture therein and said connecting means are structured and arranged to permit displacement of said member into said second plane in a direction perpendicular to said first plane.

4. The device of claim 1, wherein said element comprises engagement means for engaging peripheral surfaces of the mouthpiece or earpiece and retaining the device in connection therewith, said engagement means comprising at least one inwardly facing projection.

5. The device of claim 1, wherein said connecting means comprises at least one flexible material strip having first and second opposed ends, said first end being connected to said element and said second end being connected to said member such that said at least one flexible extends from said first plane to said second plane.

6. The device of claim 5, wherein said member has opposed sides and a lateral periphery bordering said sides, further comprising at least two of said flexible material strips positioned around said lateral periphery in a position to maintain said member in said second plane parallel to said first plane in which said element is situated when said connecting means are in said second position.

7. The device of claim 6, further comprising three of said flexible material strips, said strips being positioned symmetrically around said lateral periphery.

8. The device of claim 1, wherein said connecting means connect said element to said member such that all portions of said member are displaceable into said second plane relative to all portions of said element which remain in said first plane.

9. An assembly for covering the mouthpiece and earpiece of a telephone to protect a user from the transmission of germs, comprising
   a first frame element having an open interior and comprising a first substantially planar member arranged in said interior and first connecting means for resiliently connecting said first element to said first member such that said first member is displaceable relative to said first element, a second frame element having an open interior and comprising a second substantially planar member arranged in said interior and second connecting means for resiliently connecting said second element to said second member such that said second member is displaceable relative to said second element, and cooperating fastening means arranged in connection with said first and second elements for detachably engaging said first element to said second element.

10. The assembly of claim 9, wherein said first element and said first member are situated in a first substantially common plane and said second element and said second member are situated in a second substantially common plane, said first connecting means permitting displacement of said first member in a direction perpendicular to said first plane and said second connecting means permitting displacement of said second member in a direction perpendicular to said second plane.

11. The assembly of claim 9, wherein one of said elements comprises retaining means for retaining a gauze or mesh fabric for restricting the transmission of germs from the mouthpiece or earpiece to a user of the assembly and each of said elements comprises engagement means for engaging peripheral surfaces of the mouthpiece or earpiece of the telephone handset and retaining the assembly in connection therewith, said engagement means comprising at least one inwardly facing projection arranged on said element.

12. The assembly of claim 9, wherein said first connecting means comprises at least a first flexible material strip having first and second opposed ends, said first end of said first material strip being connected to said first element and said second end of said first material strip being connected to said first member, and said second connecting means comprises at least a second flexible material strip having first and second opposed ends, said first end of said second material strip being connected to said second element and said second end of said second material strip being connected to said second member.

13. The assembly of claim 9, wherein said first member has opposed sides and a lateral periphery bordering said sides and said second member has opposed sides and a lateral periphery bordering said sides, said first connecting means comprising at least first and second flexible material strips each having a first end connected to said first element and a second end connected to said first member and positioned around said lateral periphery of said first member in a position to maintain said first member in a plane parallel to the first plane in which said first element is situated, and said second connecting means comprising at least third and fourth flexible material strips each having a first end connected to said second element and a second end connected to said second member and positioned around said lateral periphery of said second member in a position to maintain said second member in a plane parallel to the second plane in which said second element is situated.

14. The assembly of claim 9, wherein said first connecting means have a first position in which said first member and said first element rest in a first, substantially common plane and a second position in which said first member is completely displaced from said first plane and situated in a second plane whereby the mouthpiece or earpiece of the telephone handset is positionable between said first plane and said second plane, and said second connecting means have a first position in which said second member and said second element rest in a third, substantially common plane and a second position in which said second member is completely displaced from said third plane and situated in a fourth plane whereby the mouthpiece or earpiece of the telephone handset is positionable between said third plane and said fourth plane.

15. A sanitary device for covering a mouthpiece of a telephone handset having a sound-receiving portion and an earpiece of a telephone handset having a sound-emitting portion to protect the user from the transmission of germs contained thereon, comprising a substantially planar flexible member having two open interior regions, two substantially planar sections adjoining respective ones of said interior regions, and connecting means for connecting said planar regions, said connecting means comprising a connecting portion, said planar sections being movable relative to said connecting portion and structured and arranged to fit directly against the sound-receiving portion of the mouthpiece or the sound-emitting portion of the earpiece of the telephone handset while said connecting portion is positioned at a rear of the handset such that the mouthpiece and earpiece extend through a respective one of said interior regions.

16. The device of claim 15, wherein said member comprises thermoplastic rubber.

17. The device of claim 15, wherein at least one of said planar regions comprises an aperture therein and means for retaining a mesh fabric or gauze for covering said aperture.

18. The device of claim 15, wherein said connecting means further comprises extension arms extending from said connecting portion to each of said planar regions to define said open interior regions between said arms, said connecting portion and said planar regions.

19. The device of claim 15, wherein a first one of said planar regions comprises an aperture therein and means for retaining a mesh fabric or gauze for covering said aperture, and a second one of said planar regions comprises only an aperture for permitting the transmission of sound therethrough.

20. The device of claim 15, wherein said member has a unitary, substantially uniform construction and is made exclusively of a single material.

* * * * *